July 2, 1963    J. W. SANDBERG ETAL    3,095,825
LOCKING MECHANISM FOR TELESCOPING MEMBERS
Filed July 10, 1961    2 Sheets-Sheet 1
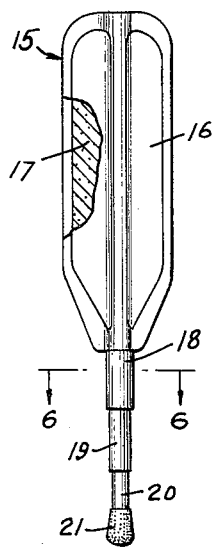
FIG. 1.
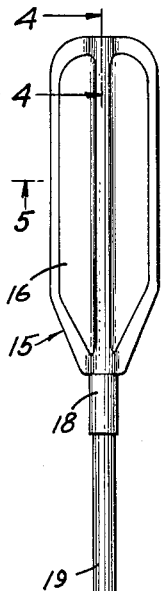
FIG. 2.
FIG. 13.
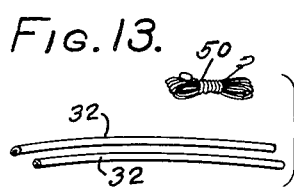
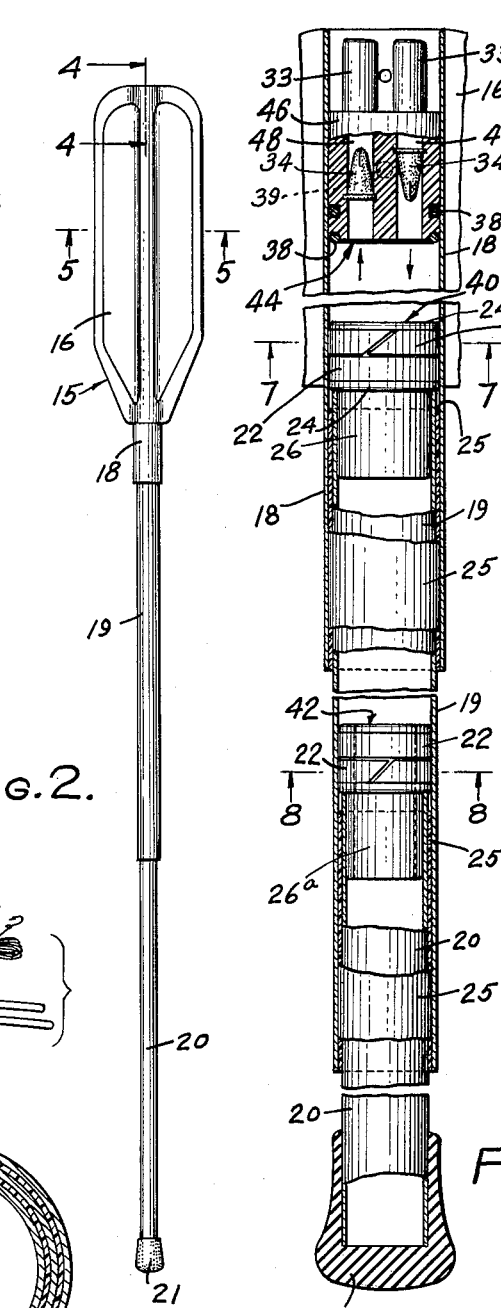
FIG. 3.
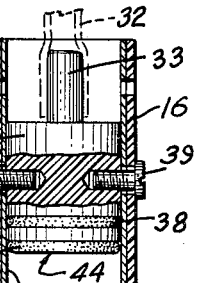
FIG. 4.
FIG. 12.
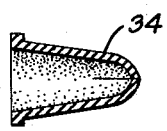
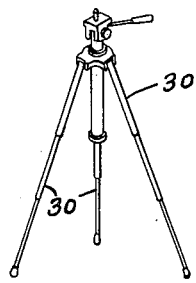
FIG. 16.
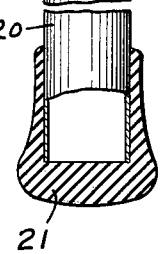
FIG. 6.
INVENTORS
JOHN W. SANDBERG
BY RUDOLF BALZER
Thomas F. Mahoney
ATTORNEY July 2, 1963  J. W. SANDBERG ETAL  3,095,825
LOCKING MECHANISM FOR TELESCOPING MEMBERS
Filed July 10, 1961  2 Sheets-Sheet 2
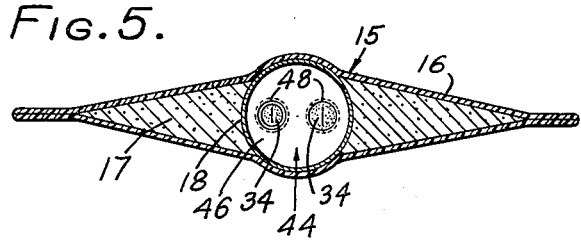
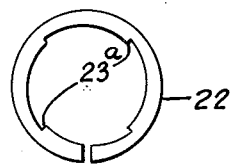
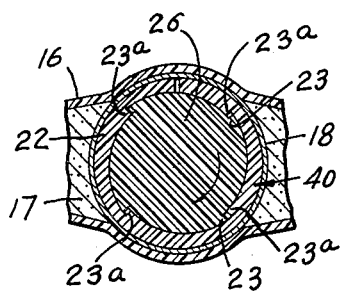
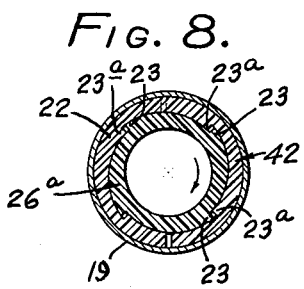
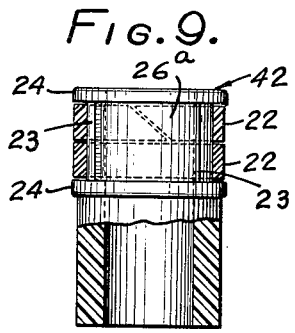
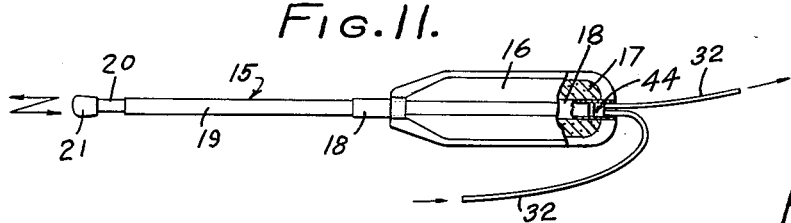
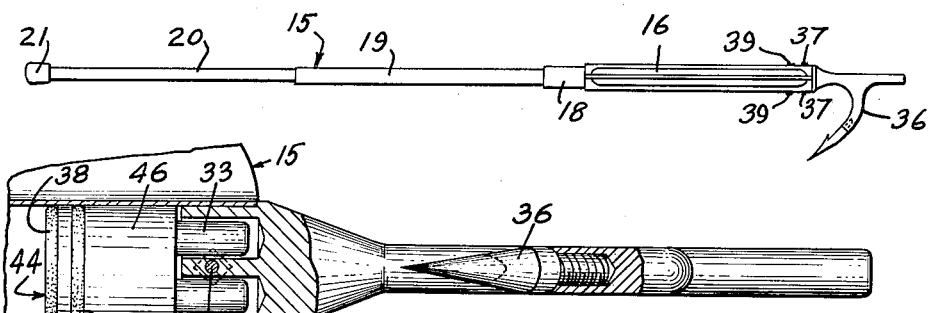
INVENTORS
JOHN W. SANDBERG
BY RUDOLF BALZER
ATTORNEY

United States Patent Office 3,095,825
Patented July 2, 1963

3,095,825
LOCKING MECHANISM FOR TELESCOPING MEMBERS
John W. Sandberg, 8723 Sepulveda Blvd., and Rudolf Balzer, 9131 Burnet Ave., both of Sepulveda, Calif.
Filed July 10, 1961, Ser. No. 122,995
5 Claims. (Cl. 103—153)

The present invention relates to a locking mechanism for telescoping members, and more particularly to a locking mechanism for locking the telescoping members in adjustable, relative axial position by a slight rotation of one member relative to the other.

Various prior art mechanisms have been proposed to lock together members which are axially slidable relative to each other, such as telescoping members used as handles for varoius tools and implements, as supporting legs for tables or the like, and as conduits for fluids and similar materials. Such prior art mechanisms often have a tendency to jam in locked position so that the mechanisms cannot be readily released when desired. Further, their locking action is also frequently ineffective to resist appreciable axial loads upon the telescoping members without slippage. In addition, for special applications, such as where the telescoping members not only must be capable of withstanding high axial loads in a locked position, but which in a released position must also be capable of operating as the cylinder and piston members of a pump, the prior art mechanisms have been found to be incapable of providing a fluid tight seal between the telescoping members.

Therefore, it is an object of the present invention to provide a locking mechanism for telescoping members, operative by twisting or rotating one of the members relative to the other.

Another object of the invention is to provide a locking mechanism for telescoping members which is effective to achieve high locking torques, and yet which is substantially free of jamming.

A further object of the invention is the provision of a locking mechanism which, in one embodiment, provides a fluid tight seal between telescoping members so that the telescoping members are capable of withstanding high axial loads in a locked position, and are also capable in their released position of operating as the cylinder and piston members of a pump. In another embodiment of the invention, the locking mechanism provides a desirable high locking torque, and yet offers no obstruction to the passage of fluid through the telescoping members so that such members may thereby serve as a conduit for fluid, or the like.

A further object of the invention is the provision of a locking mechanism for adjustably locking together telescoping members, and which is characterized by a reduction in the number of working components, and rapid locking action with a relatively small differential rotation between the telescoping members.

Another object of the invention is to provide a locking mechanism which is adapted to lock together a plurality of telescoping members which serve as a boat oar, and in which the locking mechanism provides a fluid tight seal between the telescoping members so that release of the locking mechanism permits the boat oar to function as a pump by axially moving the telescoping members relative to each other.

A further object of the invention is to provide a locking mechanism for telescoping members, and which is relatively simple in operation, rapid in its locking action, and comparatively inexpensive to manufacture.

Other objects and features of the invention will become apparent from consideration of the following description taken in connection with the accompanying drawings, in which:

FIG. 1 is an elevational view of a combination boat oar and pump incorporating the locking mechanism of the present invention, a portion thereof being broken away for clarity;

FIG. 2 is a view of the boat oar and pump device of FIG. 1, but showing the device in an extended position as compared to the showing of FIG. 1;

FIG. 3 is an enlarged, cross-sectional view of the boat oar and pump device, portions thereof being broken away for simplicity;

FIG. 4 is a view taken along line 4—4 of FIG. 2;
FIG. 5 is a view taken along line 5—5 of FIG. 2;
FIG. 6 is a view taken along line 6—6 of FIG. 1;
FIG. 7 is a view taken along line 7—7 of FIG. 3;
FIG. 8 is a view taken along line 8—8 of FIG. 3;
FIG. 9 is a detail, cross-sectional view of the piston member of the pump incorporated in the boat oar and pump device of FIG. 1, particularly illustrating the locking mechanism mounted thereupon;

FIG. 10 is an elevational view of a resilient locking member or piston ring forming a part of the present locking mechanism;

FIG. 11 is a view similar to FIG. 1, but showing the boat oar and pump device used as an air or water pump;

FIG. 12 is a detail, cross-sectional view of one of the valves used in the pump apparatus of the boat oar and pump device;

FIG. 13 is an exemplary showing of articles which may be stowed in the hollow portion of one of the telescoping members of the boat oar and pump device;

FIG. 14 is an elevational view of the boat oar and pump device in combination with a boat hook or gaff mounted adjacent the discharge end of the pump apparatus;

FIG. 15 is an enlarged, cross-sectional view of the combination of FIG. 14, illustrating the manner of mounting the boat hook adjacent the discharge end of the pump apparatus; and FIG. 16 is a perspective view of a camera tripod incorporating the locking mechanism of the present invention.

Referring to the drawings, and particularly to FIGS. 1 and 2 thereof, there is illustrated a boat oar and pump device 15 which includes at one extremity a paddle casing 16 preferably made of plastic material and filled with a buoyant material or filler 17. The volume of filler 17 is sufficient to cause the device 15 to float upon the surface of a body of water.

The paddle casing 16 includes an elongated opening within which is adhesively bonded or otherwise secured an elongated tube 18 which axially slidably receives a similar elongated tube 19 of slightly smaller diameter, the tube 19, in turn, axially slidably receiving a similar elongated tube 20 of slightly smaller diameter than the tube 19. With this arrangement, the tubes 18, 19 and 20 are telescopable within each other, as shown in FIG. 1, and are extensible to provide a long handle section for the device 15, as illustrated in FIG. 2. The inner diameter of the tubes 18, 19, and 20, and the outer diameters of the tubes 19 and 20 are preferably made such that a telescoping fit is provided. Although sleeves, as will be described subsequently, are fitted between the tubes adjacent the ends thereof, the sleeves are made thin to keep the clearance between the tubes low enough to minimize deflection of the tubes under load. In addition, the tubes 18, 19, and 20 are preferably made of a strong, light weight material such as aluminum.

One extremity of the tube 20 is closed by a cap 21, made of rubber or the like, so that the interior of the tube 20 may be used as a closed container for various articles, as will be seen.

Slidably arranged within the elongated hollow interiors of the tubes 18 and 19 are a pair of locking mechanisms 40 and 42, respectively. Each of the locking mechanisms 40 and 42 include a pair of stacked lock members or rings 22 which are diagonally split, the splits of the rings 22 of each pair being circumferentially displaced to prevent or substantially reduce fluid leakage past the rings 22. The rings 22 are each made of a resilient material, such as plastic or the like, and in their expanded condition are greater in diameter than the internal diameter of the respective tubes within which they fit so that when the rings 22 are compressed to fit within their respective tubes they exert a bias against the interior walls of such tubes, thereby frictionally constraining the rings 22 from rotating relative to their respective tubes.

The locking mechanisms 40 and 42 differ in that the locking mechanism 40 includes a solid camming element or piston 26 for mounting the upper pair of rings 22, as viewed in FIG. 3, and the locking mechanism 42 includes a cylindrical camming element or piston 26a for mounting the lower pair of rings 22. In addition, the dimensions of the locking mechanism 42 are generally less than those of the mechanism 40 in order to conform to the smaller internal diameter of the tube 19 as compared to that of the tube 18.

The piston 26 includes a reduced diameter shank which is fitted within and bonded to the upper extremity of the tube 19, the piston 26a being similarly received within and bonded to the upper extremity of the tube 20. With this arrangement, the pistons 26 and 26a are axially and rotatably movable with their respective tubes 19 and 20.

Each of the pistons 26 and 26a includes an axially extending piston groove bounded by a pair of annular shoulders 24, the lowermost shoulder 24 preferably being in engagement with the upper end of the respective tube 19 or 20 to properly locate the associated piston 26 or 26a in position.

The pair of piston rings 22 are mounted in position within the piston grooves of the pistons 26 and 26a by expanding the rings 22 sufficiently to enable them to be moved over the upper or end shoulder 24. The rings 22 are then slightly radially compressed for slidable disposition within the tubes 18 and 19, the shoulders 24 thereafter preventing appreciable axial movement of the rings 22 with respect to their associated piston.

As best seen in FIGS. 7 and 8 of the drawings, the annular surface of the grooves of the pistons 26 and 26a include a plurality of radially spaced cam lobes 23, each of the lobes 23 being characterized by a cam surface which increases in radius in a counter-clockwise direction. Each of the rings 22 includes a plurality of radially spaced, inwardly directed cam shoulders 23a, each of the shoulders 23a being characterized by a cam surface which decreases in radius in a clockwise direction. With this arrangement of the cam lobes 23 and the cam shoulders 23a, it is noted that clockwise rotation of the tube 19, and consequent rotation of the piston 26 which is bonded to the tube 19, will cause the cam lobes 23 to radially outwardly urge the cam shoulders 23a, thereby radially moving the piston rings 22 into locking frictional engagement with the inner walls of the tube 18.

Rotation of the piston 26 in a counter-clockwise direction permits the resilience of the rings 22 to move the rings 22 out of locking engagement with the inner walls of the tube 18, it being noted, however, that the rings 22 remain biased against the tube 18. The amount of this bias is not sufficient to prevent axial slidable movement between the rings 22 and the tube 18, but it is sufficient to frictionally interengage the rings 22 and the tube 18 so that the rings 22 are frictionally constrained against rotation upon rotation of the piston 26. This is an important feature of the invention since, lacking such frictional interengagement, the rings 22 would rotate with the piston 26, and the camming action of the cam lobes 23 and the cam shoulders 23a could never occur. The resilient nature of the rings 22 thus provides a unique means for satisfying this requirement for constant frictional interengagement between the rings 22 and the tube 18.

The piston 26a includes similar cam lobes 23 engageable with the cam shoulders 23a of the associated piston rings 22, and the locking action and frictional interengagement of the components are identical to that above-described in connection with the piston 26.

The extended positions of the tubes 19 and 20 are established by engagement between the lower shoulders 24 of the pistons 26 and 26a with a thin walled sleeve 25 and a thin walled sleeve 25a, respectively. The sleeves 25 and 25a are bonded or otherwise secured within the interior, respectively, of the lower extremities of the tubes 18 and 19, and act as stops for the pistons 26 and the pistons 26a. The internal diameters of the sleeves 25 and 25a are such that the tubes 19 and 20 are freely slidable therethrough.

Although the locking mechanisms 40 and 42 have been described in connection with a boat oar and pump device 15, it will be apparent that the mechanisms are equally useful in connection with other forms of extensible, telescopable elements, such as the legs 30 of the camera tripod illustrated in FIG. 16.

The particular construction of the locking mechanism 40 uniquely adapts it for use in connection with a pump apparatus 44 incorporated in the uppermost tube 18 of the boat oar and pump device 15.

The pump apparatus 44 includes a cylindrical valve housing 46 which is secured within the upper extremity of the tube 18 by a pair of screws 39 disposed through the paddle casing 16, through the walls of the tube 18, and within suitable openings in the housing 46. The housing 46 includes a pair of annular sealing members 38 at its lower extremity to provide a fluid tight seal between the tube 18 and the housing 46, the lower sealing member 38 also acting as a buffer for the piston 26.

The valve housing 46 includes a pair of axially extending fluid passages 48 within which are mounted, respectively, a pair of one-way valves 34, one of the fluid passages 48 constituting an inlet passage, and the other of the passages 48 constituting an outlet passage, as indicated by the arrows in FIG. 3. In addition, the valve housing 46 includes a pair of tubular conduits 33 which form extensions of the fluid passages 48, each of the conduits 33 being adapted to receive one end of a length of tubing 32, as indicated in phantom outline in FIG. 4.

In operation, the boat oar and pump device 15 is operated as a pump by first attaching a pair of tubes 32 to the conduits 33. The tubes 18 and 19 are rotated relative to each other to release the locking mechanism 40, as above-described, so that the tube 19 is freely axially slidable within the tube 18. As will be apparent from FIG. 3 of the drawings, outward or extensible movement of the tube 19 moves the locking mechanism 40, which now acts as a piston, through a suction stroke, drawing air or water through the fluid passage 48 at the right, as viewed in FIG. 3 of the drawings. Inward or telescopable movement of the tube 19 moves the locking mechanism 40 through a discharge stroke, urging fluid through the other of the fluid passages 48. It is noted that the rings 22 serve as a seal during this pumping operation. In this way, the locking mechanism 40 is adapted to be used not only as a locking mechanism for fixing the tubes 18 and 19 with respect to each other, but also serves as a piston in the pump arrangement described.

The annular locking mechanism 42 is substantially identical in operation to the locking mechanism 40, but the provision of a central aperture therethrough adapts the locking mechanism 42 to convey fluid through locked sections of a fluid conduit, for example. In addition, in the embodiment of FIG. 3, the opening permits elongated articles, such as the lengths of tubing 32, to be stored in the hollow body of the tubes 19 and 20, as well as other articles, such as fishing line 50.

The conduits 33 and the open upper extremity of the tube 18 are adapted to slidably receive a boat hook 36, a nut and bolt assembly 37 being employed to secure the boat hook 36 in position. With this arrangement, the boat oar and pump device 15 is also useful in another capacity.

There has thus been described a locking mechanism adapted to quickly and easily lock together, in desired relative axial position, a pair of telescopable members. The locking mechanism is substantially free of undesirable jamming, and is operative by a slight rotation of one of the telescopable members relative to the other. Since the resilient locking members or rings 22 are continuously biased against the outer of the telescopable members, the locking mechanism is always actuable to lock together the telescopable members, and also is adapted to provide a continuous fluid tight seal when the telescopable members are reciprocably, axially movable in a pump application.

While the invention has been described by means of a specific example and a specific embodiment, the invention is not limited thereto since obvious modification and variations will occur to those skilled in the art without departing from the spirit and scope of the invention as defined by the appended claims.

We claim:

1. In a locking mechanism for a pump operative to move fluid into and out of an elongated cylinder, the combination of: a member adapted for axial and rotatable movement in the cylinder; a piston carried by and rotatable with said member, and including a plurality of radially outwardly directed cam lobes; and a resilient piston ring mounted to said piston for axial and slidable movement in the cylinder, and including a plurality of radially inwardly directed cam shoulders adjacent said cam lobes, whereby said piston ring is radially compressible for resilient slidable engagement with the walls of the cylinder, and said cam lobes are urgable radially outwardly into forcible engagement with said cam shoulders upon rotation of said member to radially expand said piston ring for locking frictional engagement with the cylinder to thereby lock said piston in any position of its stroke.

2. In a locking mechanism for a pump operative to move fluid into and out of an elongated cylinder, the combination of: a member adapted for axial and rotatable movement in the cylinder; a piston carried by and rotatable with said member, and including a plurality of radially outwardly directed cam lobes; and a plurality of split and resilient piston rings mounted in stacked relationship upon said piston, the splits of said rings being circumferentially displaced to reduce fluid leakage through said splits, said piston rings being radially compressible for resilient slidable engagement with the cylinder and each including a plurality of radially inwardly directed cam shoulders adjacent certain of said plurality of cam lobes, whereby said cam lobes are urgable radially outwardly into forcible engagement with said cam shoulders upon rotation of said member for radially expanding said piston rings into locking frictional engagement with said cylinder to thereby lock said piston in any position of its stroke.

3. In a fluid-tight locking mechanism for a pair of tubular telescoping members, the combination of: camming means adapted to be secured to one of the members for axial movement therewith; and lock means in engagement with said camming means, said lock means including a plurality of axially aligned, resilient rings, each of said rings having an axial split whereby said rings are radially compressible for resilient, slidable engagement with the other of said members, said splits being displaced relative to each other to prevent fluid leakage therepast, said rings being radially expansible upon rotation of said camming means for locking frictional engagement with said other of said members.

4. In a fluid-tight locking mechanism for a pair of tubular telescoping members, the combination of: camming means adapted to be secured to one of the members for axial movement therewith; and lock means in engagement with said camming means, said lock means including a plurality of axially aligned, resilient rings, each of said rings having an axial split whereby said rings are radially compressible for resilient, slidable engagement with the other of said members, said splits being displaced relative to each other to prevent fluid leakage therepast, said rings being radially expansible upon rotation of said camming means for locking frictional engagement with said other of said members, said camming means including means engageable by said rings to limit axial movement of said rings relative to said camming means.

5. In a fluid-tight locking mechanism for a pair of tubular telescoping members, the combination of: camming means adapted to be secured to one of the members for axial movement therewith, said camming means including a plurality of cam lobes; and lock means in engagement with said camming means, said lock means including a plurality of axially aligned rings, each of said rings having an axial split whereby said rings are radially compressible for resilient, slidable engagement with the other of said members, said splits being displaced relative to each other to prevent fluid leakage therepast, said rings being radially expansible for locking frictional engagement with said other of said members, said rings including a plurality of cam shoulders adjacent said cam lobes whereby rotation of said camming means urges said cam lobes against said cam shoulders to radially expand said rings for locking frictional engagement with said other of said members.

References Cited in the file of this patent

UNITED STATES PATENTS

| 808,992 | Lawson | Jan. 2, 1906 |
| 2,459,785 | Allerton | Jan. 25, 1949 |
| 2,526,415 | Refsdal | Oct. 17, 1950 |